(12) United States Patent
Sharman et al.

(10) Patent No.: US 11,265,545 B2
(45) Date of Patent: Mar. 1, 2022

(54) DATA ENCODING AND DECODING

(71) Applicant: Sony Corporation, Tokyo (JP)

(72) Inventors: Karl James Sharman, Newbury (GB); Magali Kimlee Miri Philippe, Hampshire (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/965,543

(22) PCT Filed: Jan. 23, 2019

(86) PCT No.: PCT/GB2019/050182
§ 371 (c)(1),
(2) Date: Jul. 28, 2020

(87) PCT Pub. No.: WO2019/150076
PCT Pub. Date: Aug. 8, 2019

(65) Prior Publication Data
US 2021/0144378 A1 May 13, 2021

(30) Foreign Application Priority Data
Feb. 5, 2018 (GB) .................................. 1801838

(51) Int. Cl.
*H04N 19/124* (2014.01)
*H04N 19/159* (2014.01)
*H04N 19/17* (2014.01)

(52) U.S. Cl.
CPC ......... *H04N 19/124* (2014.11); *H04N 19/159* (2014.11); *H04N 19/17* (2014.11)

(58) Field of Classification Search
CPC ..... H04N 19/124; H04N 19/17; H04N 19/159
See application file for complete search history.

(56) References Cited

U.S. PATENT DOCUMENTS

2006/0215912 A1  9/2006  Liu et al.
2007/0229325 A1* 10/2007  Yokose .................. H04N 19/60
                                                                          341/51

(Continued)

FOREIGN PATENT DOCUMENTS

WO    WO 2006/102571 A1    9/2006

OTHER PUBLICATIONS

International Search Report dated Apr. 4, 2019 in PCT/GB2019/050182 filed on Jan. 23, 2019.

(Continued)

*Primary Examiner* — Nam D Pham
(74) *Attorney, Agent, or Firm* — Oblon, McClelland, Maier & Neustadt, L.L.P.

(57) ABSTRACT

A data encoding method comprises generating an ordered array of data values representing an image region and having an array order; deriving a quantization parameter indicating a quantization degree so that the ordered array of data values, when encoded using that quantization degree, meets one or more predetermined criteria; quantizing the data values using the derived quantization parameter to generate respective quantized values; detecting a number of non-zero quantized values; if no more than a threshold number of first values in the array order are non-zero, selecting a different quantization parameter and quantizing the data values using a quantization degree indicated by the selected different quantization parameter; and entropy encoding at least the non-zero quantized values.

21 Claims, 10 Drawing Sheets

(56) References Cited

U.S. PATENT DOCUMENTS

| | | |
|---|---|---|
| 2008/0219354 A1 | 9/2008 | Segall et al. |
| 2011/0002381 A1 | 1/2011 | Yang et al. |
| 2012/0002729 A1 | 1/2012 | Osamoto |
| 2015/0215621 A1 | 7/2015 | Liu et al. |
| 2015/0373327 A1 | 12/2015 | Zhang et al. |
| 2016/0227247 A1 | 8/2016 | Zou et al. |

OTHER PUBLICATIONS

Chen, J. et al., "Algorithm Description of Joint Exploration Test Model 1," Joint Video Exploration Team (JVET) of ITU-T SG 16 WP 3 and ISO/IEC JTC 1/SC 29/WG 11, JVET-A 1001, Oct. 19, 2015, pp. 1-25, 27 total pages.

"Series H: Audiovisual and Multimedia Systems Infrastructure of audiovisual services—Coding of moving video," International Telecommunication Union, Recommendation ITU-T H.265, Dec. 2016, pp. 1-643, 662 total pages.

Sze, V. et al., "High Efficiency Video Coding (HEVC) Algorithms and Architectures," Integrated Circuits and Systems, 2014, pp. 209-274, 70 total pages.

\* cited by examiner

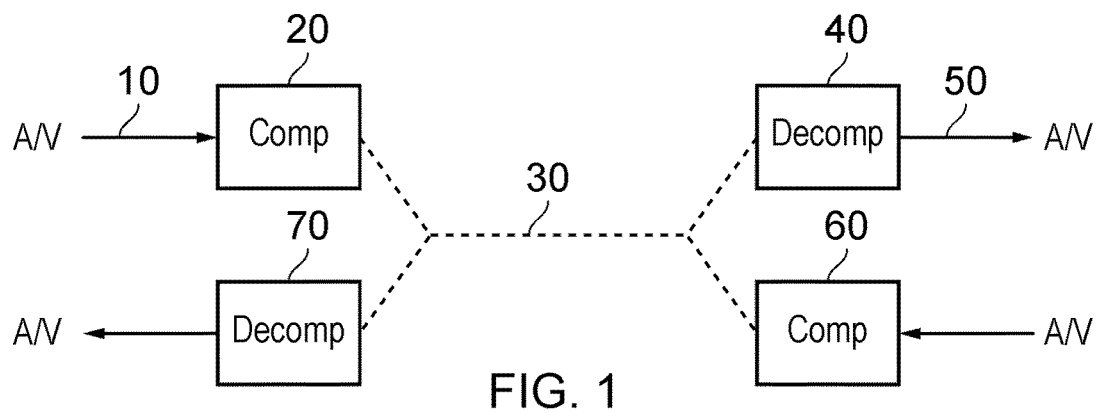
FIG. 1
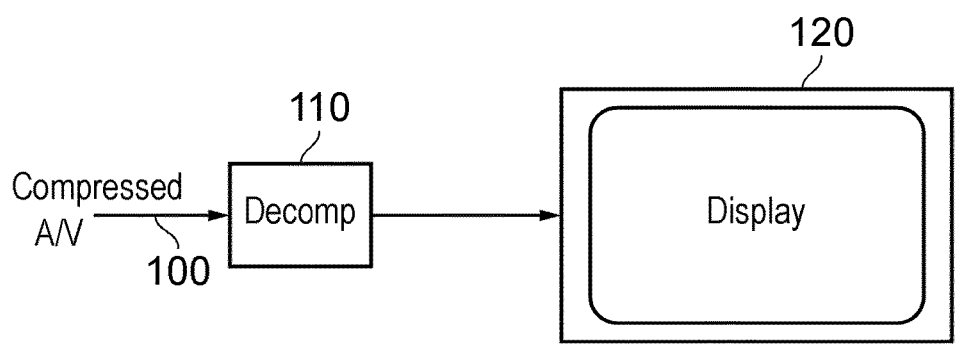
FIG. 2
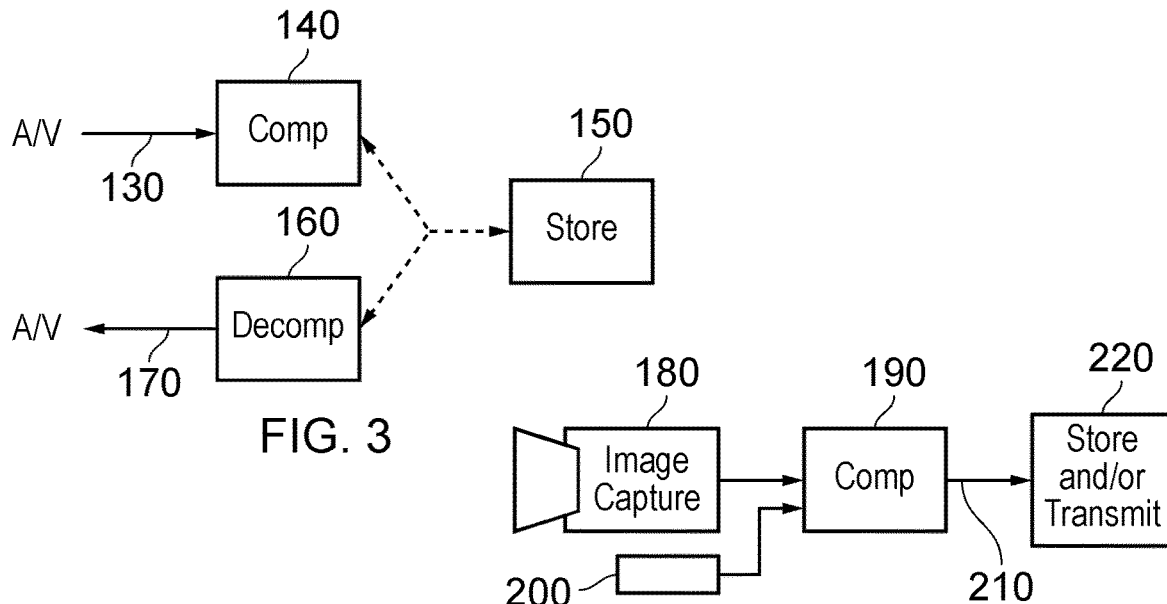
FIG. 3
FIG. 4
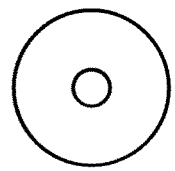
FIG. 5
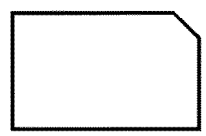
FIG. 6

DATA ENCODING AND DECODING

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantizing the frequency domain coefficients and then applying some form of entropy encoding to the quantized coefficients. This can achieve compression of the video data. A corresponding decoding or decompression technique is applied to recover a reconstructed version of the original video data.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 schematically illustrates an audio/video (A/V) data transmission and reception system using video data compression and decompression;

FIG. 2 schematically illustrates a video display system using video data decompression;

FIG. 3 schematically illustrates an audio/video storage system using video data compression and decompression;

FIG. 4 schematically illustrates a video camera using video data compression;

FIGS. 5 and 6 schematically illustrate storage media;

DESCRIPTION OF THE PREFERRED EMBODIMENTS

Figure 7:
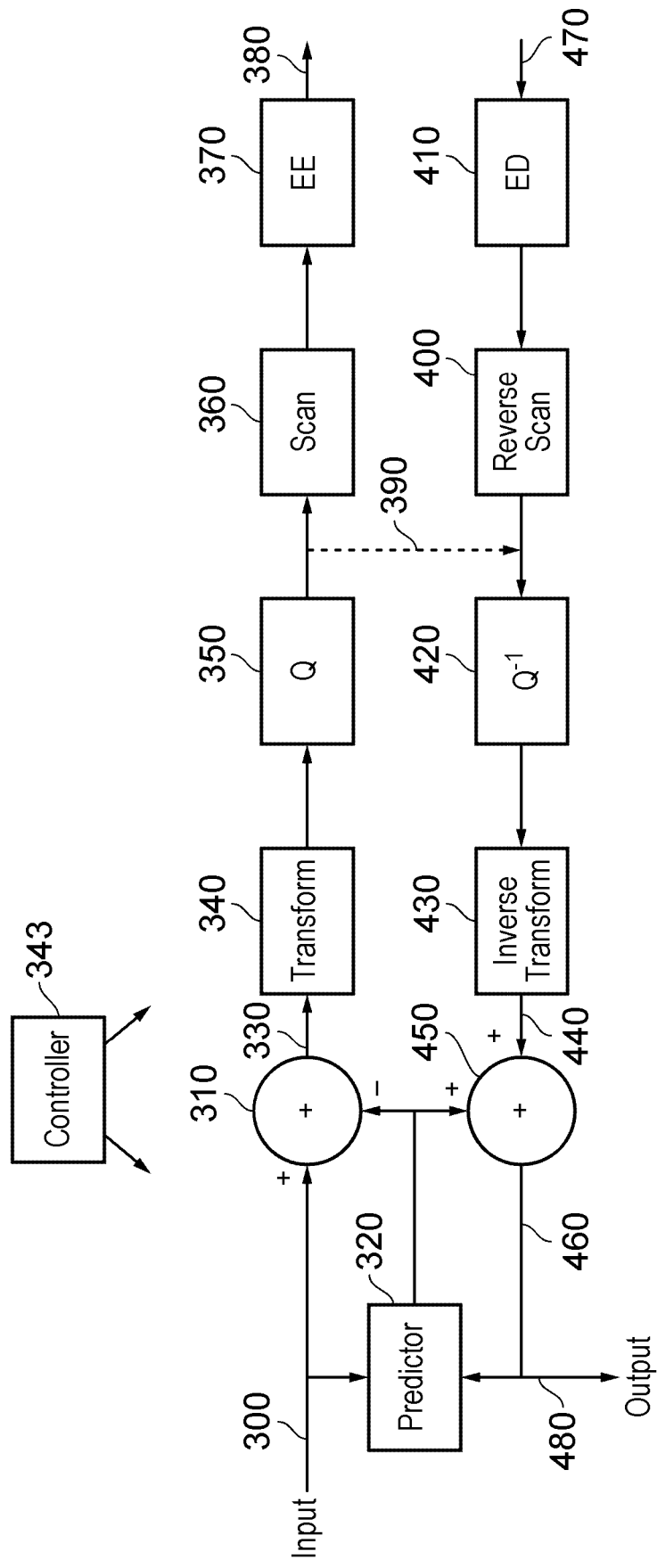
FIG. 7 provides a schematic overview of a video data compression and decompression apparatus.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 may be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform.

The choice of transform may be determined explicitly and/or be dependent upon side information used to configure the encoder and decoder.

In some examples, this represents the generation of an ordered array of data values representing an image region and having an array order. This process can include predicting an image region for an image to be encoded, by the predictor 320; and generating (by the adder 310) a residual image region dependent upon the difference between the predicted image region and a corresponding region of the image to be encoded.

The ordered array of data values can then comprise data values of a representation of the residual image region. In a so-called transform skip mode, a frequency transform is not used, but in other examples such as the DCT example given above (or in examples using other transforms such as the discrete sine transform (DST), or different transforms in orthogonal array directions, or with an optional additional non-separable secondary transform (NSST)), the generation of the ordered array also comprises frequency transforming the residual image region; in which the ordered array of data values comprises data values of a frequency-transformed representation of the residual image region. Inverse transforms (where appropriate) can be carried out on the dequantized data at decoding, and the resulting data combined with a predicted version of the image region (predicted using the same technique as that applied at encoding) to generate an output image region.

Non-separable secondary transforms (NSST) are discussed in "Algorithm Description of Joint Exploration Test Model 1", Chen et al, Joint Video Exploration Team (JVET) document JVET-A1001. In this document, an NSST is disclosed which represents a secondary transform applied between a forward core transform and quantization (at the encoder side) and between de-quantization and an inverse core transform (at the decoder side). The contents of this document are hereby incorporated by reference into the present description.

In example embodiments using one or more frequency transformations, the array order may be from a data value representing lowest spatial frequencies (such as a DC coefficient in the case of a DCT transformation) to a data value representing highest spatial frequencies. For example, a so-called zig-zag order may be used.

In other examples not using a frequency transform, the predicting step may comprise predicting samples of the image region in dependence upon other previously encoded and decoded image samples, displaced from the predicted samples in a direction defined by a prediction mode; and the array order can be such that predicted data values spatially closer to the other previously encoded and decoded image samples are earlier in the array order.

The output of the transform unit 340, which is to say, a set of DCT coefficients for each transformed block of image data, is supplied to a quantizer 350. Various quantization techniques are known in the field of video data compression, ranging from a simple multiplication by a quantization scaling factor through to the application of complicated lookup tables at a quantization degree under the control of a quantization parameter. The general aim is twofold. Firstly, the quantization process reduces the number of possible values of the transformed data. Secondly, the quantization process can increase the likelihood that values of the transformed data are zero. Both of these can make the entropy encoding process, to be described below, work more efficiently in generating small amounts of compressed video data.

As part of the quantization process, a quantization parameter (QP) is derived which indicates a quantization degree so that the ordered array of data values, when encoded using that quantization degree, meets one or more predetermined criteria. An example of such a predetermined criterion is a data quantity criterion, for example requiring that (at least a prediction of) the data quantity in the encoded bitstream resulting from such quantization and subsequent entropy encoding is no greater than a certain limit.

The transformed data (or, in the case of a transform skip operation to be discussed below, reordered but not transformed residual data) are subject to a quantization process which may be equivalent to division by a quantization step size. (At decoding, the process of dequantization can be viewed as equivalent to multiplication by the quantization step size). The quantization step size determines the degree or amount (for example, harshness) of quantization which is applied. The quantization step size is itself indicated by a quantization parameter QP which is mapped to a quantization step size. The mapping may be such that the quantization step size is associated logarithmically to QP. For example, an increase in QP by 6 could indicate a doubling of the quantization step size. However, different mappings could be used. the mapping can vary in dependence on (for example) bit depth (number of bits in a representation of each sample before encoding). So, for example, at a bit depth of 8 bits, a QP of 22 indicates or is mapped to a divide by 8 operation (quantization step size=8). At a bit depth of 10 bits, a QP of 22 indicates or is mapped to a divide by 32 operation (quantization step size=32). So, in example embodiments it is the QP value which is selected, for example in order to address one or more predetermined criteria, but then the degree of quantization (related to the quantization step size) is determined by a mapping of the QP value.

A data scanning process is applied by a scan unit 360. The purpose of the scanning process is to reorder the quantized transformed data so as to gather as many as possible of the non-zero quantized transformed coefficients together, and of course therefore to gather as many as possible of the zero-valued coefficients together. These features can allow so-called run-length coding or similar techniques to be applied efficiently. So, the scanning process involves selecting coefficients from the quantized transformed data, and in particular from a block of coefficients corresponding to a block of image data which has been transformed and quantized, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed versions. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantizer 350 to the input of a complimentary inverse quantizer 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantizer 420 and an inverse transform unit or circuitry 430 provide the respective inverse functions of the entropy encoder 370, the scan unit 360, the quantizer 350 and the transform unit 340. For now, the discussion will continue through the compression process; the process to decompress an input compressed video signal will be discussed separately below.

In the compression process, the scanned coefficients are passed by the return path 390 from the quantizer 350 to the inverse quantizer 420 which carries out the inverse operation of the scan unit 360. An inverse quantization and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantizer 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
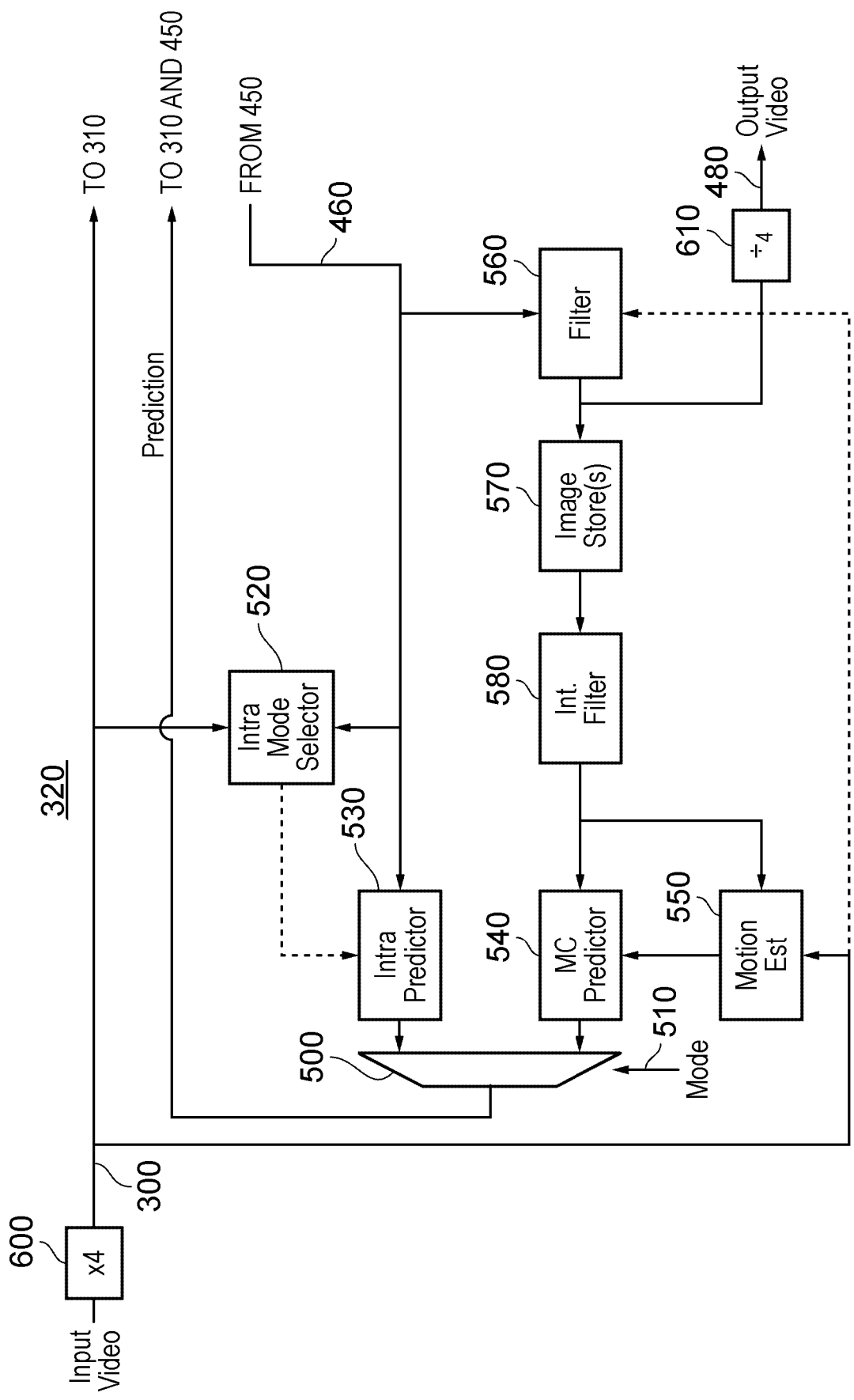
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 12/2016. Also: High Efficiency Video Coding (HECV) algorithms and Architectures, Editors: Madhukar Budagavi, Gary J. Sullivan, Vivienne Sze; ISBN 978-3-319-06894-7; 2014 which is incorporated herein in its entirety by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
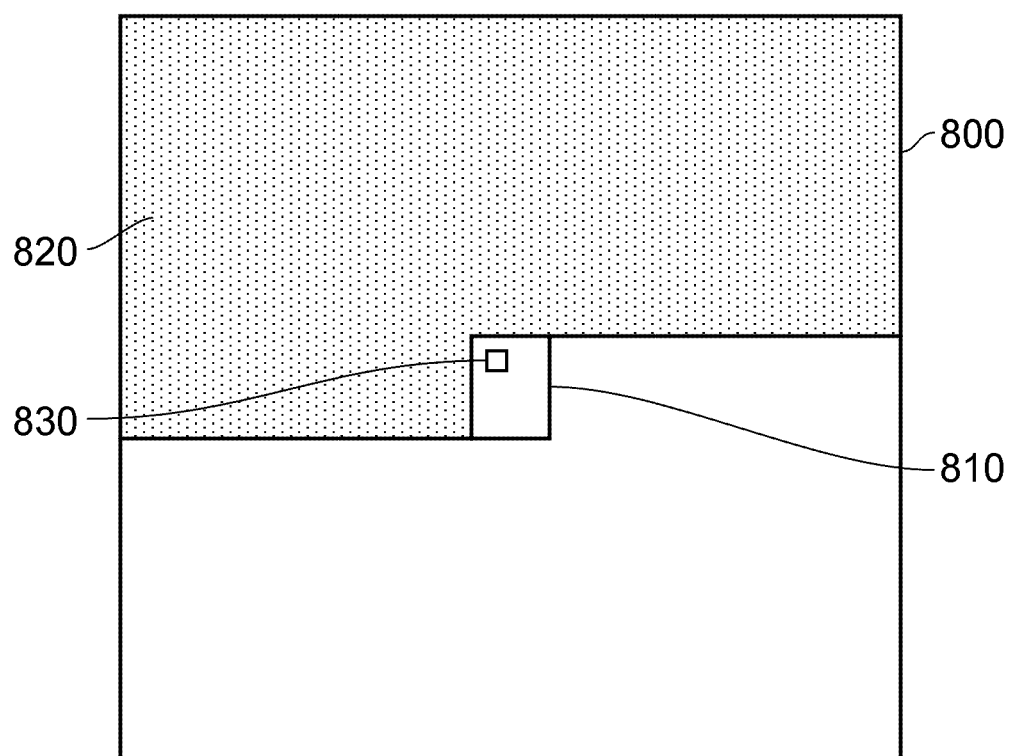
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of the same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
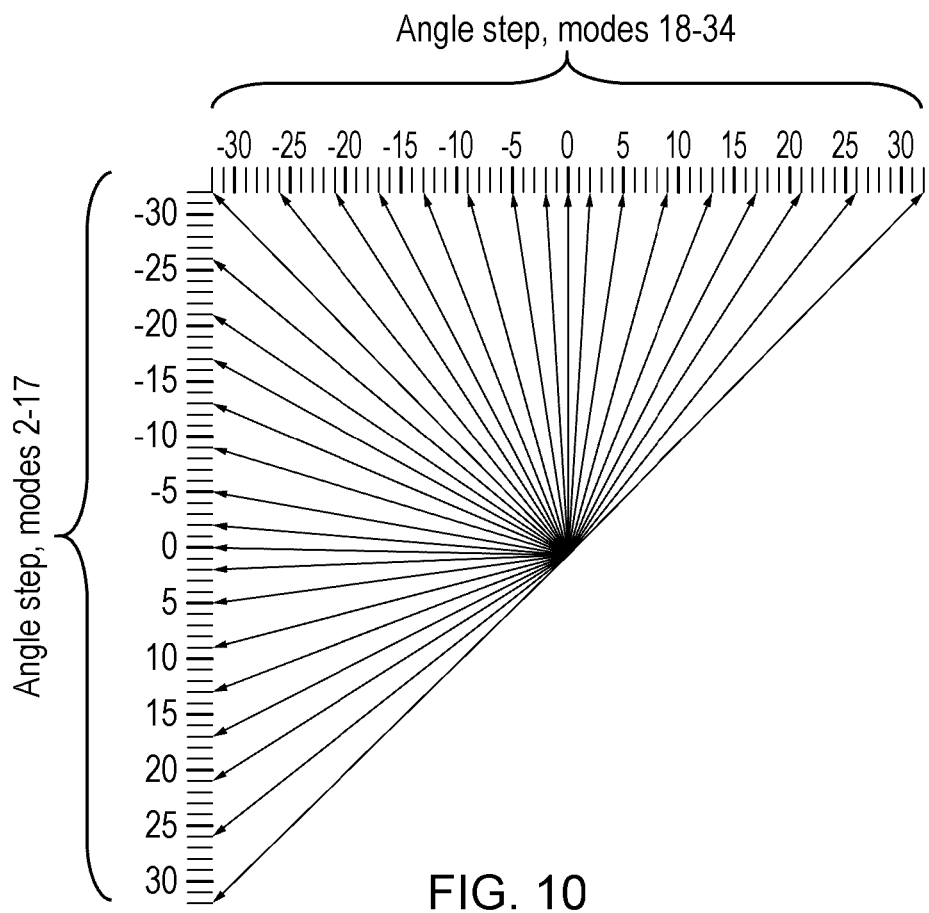
FIG. 10 schematically illustrates a set of possible intra-prediction directions.
Figure 11:
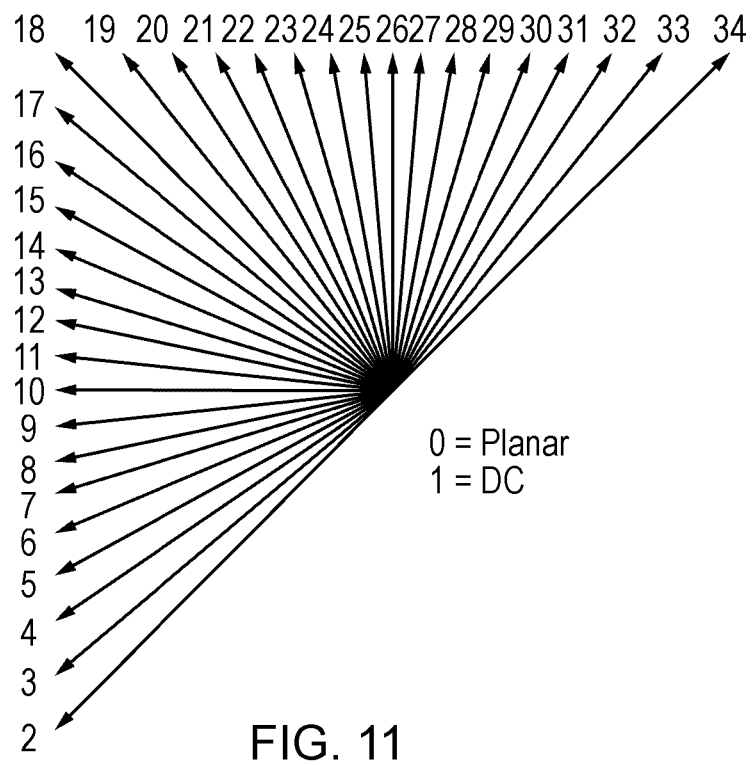
FIG. 11 schematically illustrates a set of prediction modes.
Figure 12:
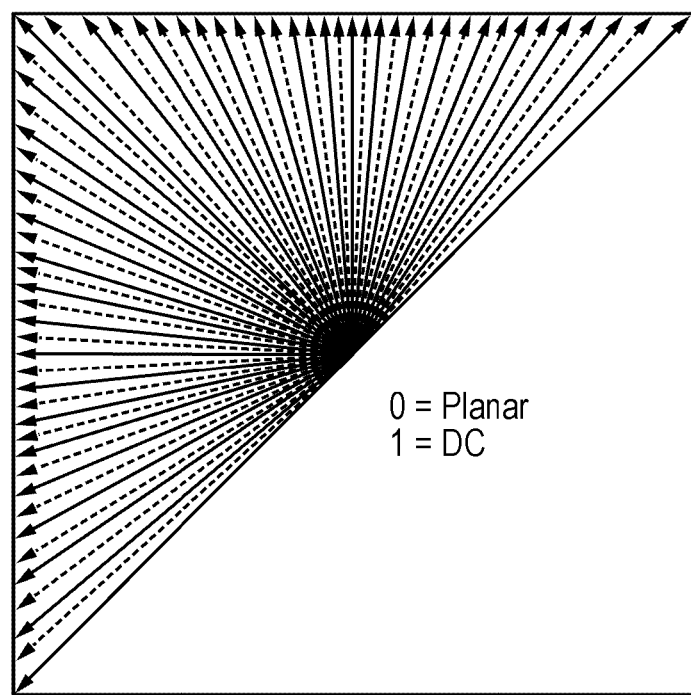
FIG. 12 schematically illustrates another set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image (and the image decoder is configured to detect such data).

Figure 13:
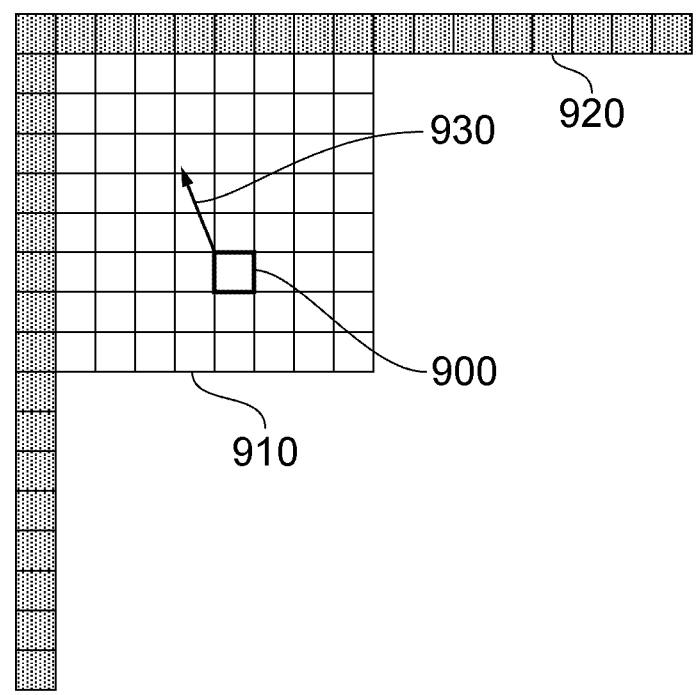
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figure 14:
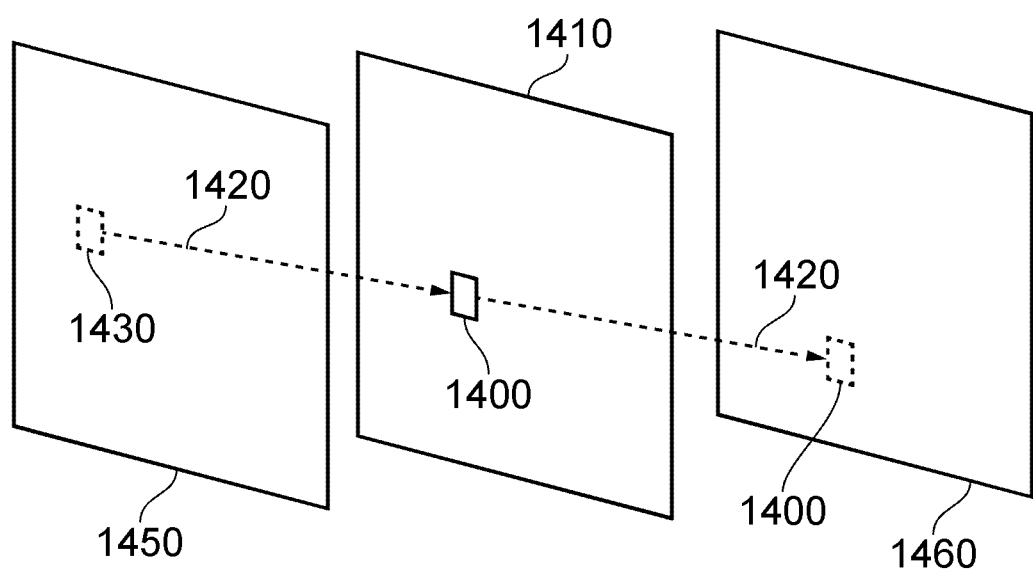
FIG. 14 schematically illustrates an inter-prediction process.

FIG. 14 schematically illustrates an inter-prediction process, in which a block or region 1400 of a current image 1410 is predicted with respect to a block 1430, 1440 or both, pointed to by a motion vector 1420 in one or more other images 1450, 1460. The predicted block can be used as discussed above in the generation of residual data which is encoded as described above.

Figure 15:
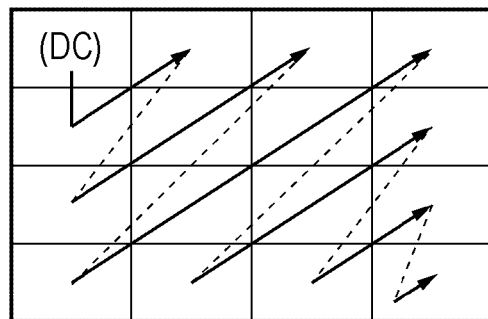
FIG. 15 schematically illustrates example scanning orders.

FIG. 15 provides an example of an array order associated with an example 4×4 block of data. This order is not necessarily the processing order for each aspect of encoding or decoding processing mentioned above, but is associated with the block or region for the purposes of detecting the presence of significant non-zero coefficients in the array order in the manner to be described below. Differently-sized and/or differently-shaped blocks or regions may have corresponding associated array orders, and in at least some examples the array orders are arranged to be in an order of expected significance (magnitude, from expected greatest towards expected lowest) of the coefficients to be quantized.

The example of FIG. 15 relates to a discrete cosine transform as applied to a residual block, in which the top-left coefficient (as drawn) is a DC (lowest spatial frequency) coefficient, generally expected to be the largest magnitude of the coefficients. Other examples including discrete sine transform (DST) and so-called transform-skip blocks will be discussed below.

A potential problem can arise in the case of (for example) a DCT block that has only a DC coefficient which is non-zero. This is not an uncommon situation and can result in the coded coefficient actually being bigger than the actual residual DC which the system is attempting to encode (in the spatial domain).

For example, for QP<22, the quantizer would be applying a division by a factor less than 8 (assuming no additional scalings are applied, by, for example, scaling lists/quantization matrices). However, the DCT process for an 8×8 block would apply an effective scaling of sqrt(8×8)=8 during the transformation. This would then result in a DC coefficient that was larger in magnitude than the actual DC offset. Or, for 16×16 blocks, the DCT would cause a residual block with an effective DC value to be scaled by 16, and hence the coded coefficient value is at least twice the size of the resulting DC residual value.

That is to say, if a 16×16 residual block consisted of just the value '1' in every location, after the transformation, the transform DC coefficient would contain the value '16', with all other transformed coefficients being '0'. The quantizer would then scale the coefficients as required. However, if the quantizer is only applying a division of 8, the resulting quantized coefficient would be of the value '2', which is twice as accurate as required to invert the operation. Therefore in this case, the quantizer could have equally applied a division of 16 and yet result in the same (or similar) outcome. Therefore the minimum quantization could be defined a division of 16 in this case; division by 8 would be an insufficiently harsh quantization amount.

For example, for QP<28, the quantizer applies/16 and the quantized DC coefficient for 16×16 is bigger than the value required.

For example, for QP<34, the quantizer applies/32 and the quantized DC coefficient for 32×32 is bigger than the value required.

For example, for QP<40, the quantized DC coefficient for 64×64 is bigger than the value required.

Example embodiments address this potential issue in that for at least those blocks that have just the DC coefficient (corresponding to a number no greater than a threshold number of coefficients of 1), the quantizer should apply a minimum quantization, that is optionally block size dependent. Similarly, for blocks that have more than just the DC but no greater than another threshold number (such as 3) of non-zero coefficients, the quantizer can apply a (potentially different) minimum quantization parameter from which a quantization degree is determined as discussed above. The quantization parameter as applied can be different to the quantization parameter as derived for use with that block.

Another aspect of the test applied here can relate to the location of the non-zero coefficients. For example, the test can detect whether the n (such as 1 or 3) non-zero coefficients are the n lowest frequency (or lowest in a scan or array order starting from DC) coefficients in order to apply the different quantization parameter.

The test for whether there is at least the threshold number of non-zero values can be made in respect of the values pre-quantization, which is to say (in the example given above) in respect of the DCT values. Alternatively, the judgement can be made with respect to the quantized data values. The judgement as made refers to the data values in the array order, for example starting (in this example) at DC and progressing towards higher spatial frequency components for example using the scan of FIG. 15.

If a corresponding judgement is to be made at the decoder side, in order to apply a corresponding modification of the quantization parameter for use in determining a quantization (or dequantization) degree for use in dequantizing, then it can be appropriate to make the judgement based on the same data set, which is to say:

(a) to detect whether the number of quantized data values at the encoder, in the array order, has at least the threshold number of non-zero values; and (b) to detect whether the number of entropy-decoded data values to be dequantized at the decoder, in the array order, has at least the threshold number of non-zero values.

However, in other examples, such as examples in which the quantization parameter as actually used by the encoder is signalled in or with the encoded data stream, the encoder could be operable instead to detect whether the number of data values to be quantized at the encoder, in the array order, has at least the threshold number of non-zero values.

Figure 16:
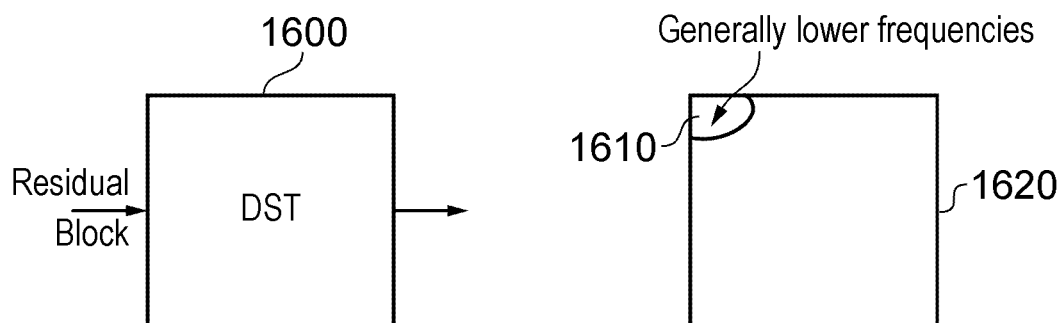
FIG. 16 schematically illustrates a frequency transform process.

FIG. 16 schematically illustrates the use of a discrete sine transform (DST) transformation unit 1600. Although the precise effect is different to the DCT, as with the DCT an expected most significant coefficient will tend to be found in the top left (lowest spatial frequencies) position 1610 of the transformed block 1620. A similar top-left to bottom-right array order to that of FIG. 15 may be used for detecting how many first non-zero values are present.

Figure 17:
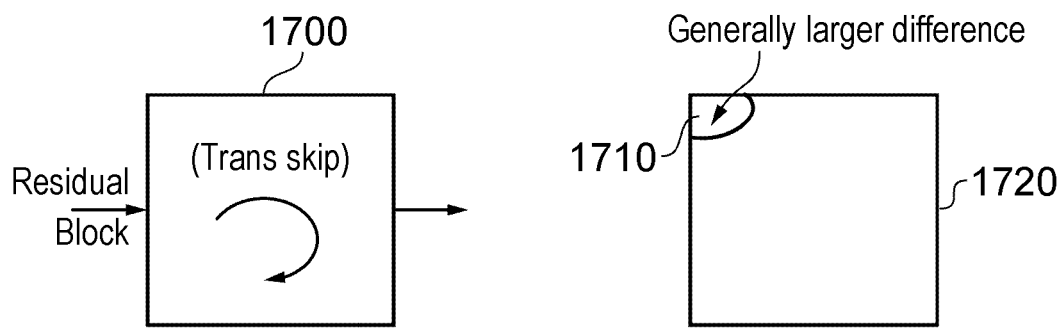
FIG. 17 schematically illustrates a transform skip process.

FIG. 17 schematically illustrates the use of a so-called transform-skip mode, in which a spatial frequency transformation is selectively not used. The use of transform skip mode is signalled to the decoder by the encoder. However, since the properties of the residual data block can be such that sample positions closest to the reference samples (that is to say, the left and upper edges of the block) may tend to have lower differences by virtue of their proximity to the reference samples, an inversion process 1700 can be used to rotate the sample positions for subsequent encoding (and a corresponding inverse rotation process applied at decoding) so that the sample in the top left position 1710 of the inverted block 1720, the top left position as drawn corresponding to the location of the DC coefficient in a DCT system, is the sample from the bottom right of the residual block, which is to say that sample position furthest from the reference samples. The sample 1710 is expected to have generally the largest value in a transform-skip block. A similar top-left to bottom-right array order to that of FIG. 15 may be used for detecting how many first non-zero values are present.

Transform skip operation is discussed section 8.6.2 of The CABAC context modelling and encoding process is described in more detail in SERIES H: AUDIOVISUAL AND MULTIMEDIA SYSTEMS Infrastructure of audiovisual services—Coding of moving video High efficiency video coding Recommendation ITU-T H.265 12/2016. Also: High Efficiency Video Coding (HECV) algorithms and Architectures, Editors: Madhukar Budagavi, Gary J. Sullivan, Vivienne Sze; ISBN 978-3-319-06894-7; 2014 Chap 8 p 209-274 which is incorporated herein in its entirety by reference. For some regions or blocks, coding gains can be achieved by skipping the transform. The residual in the spatial domain is quantized and encoded, in some instances in a reverse spatial order (to align the expected magnitude of spatial differences, greatest in the lower right of the block furthest away from the reference samples, with the expected order of coefficient magnitude in a frequency transformed block (generally greatest at the top left of DC coefficient).

Figures 18, 19:
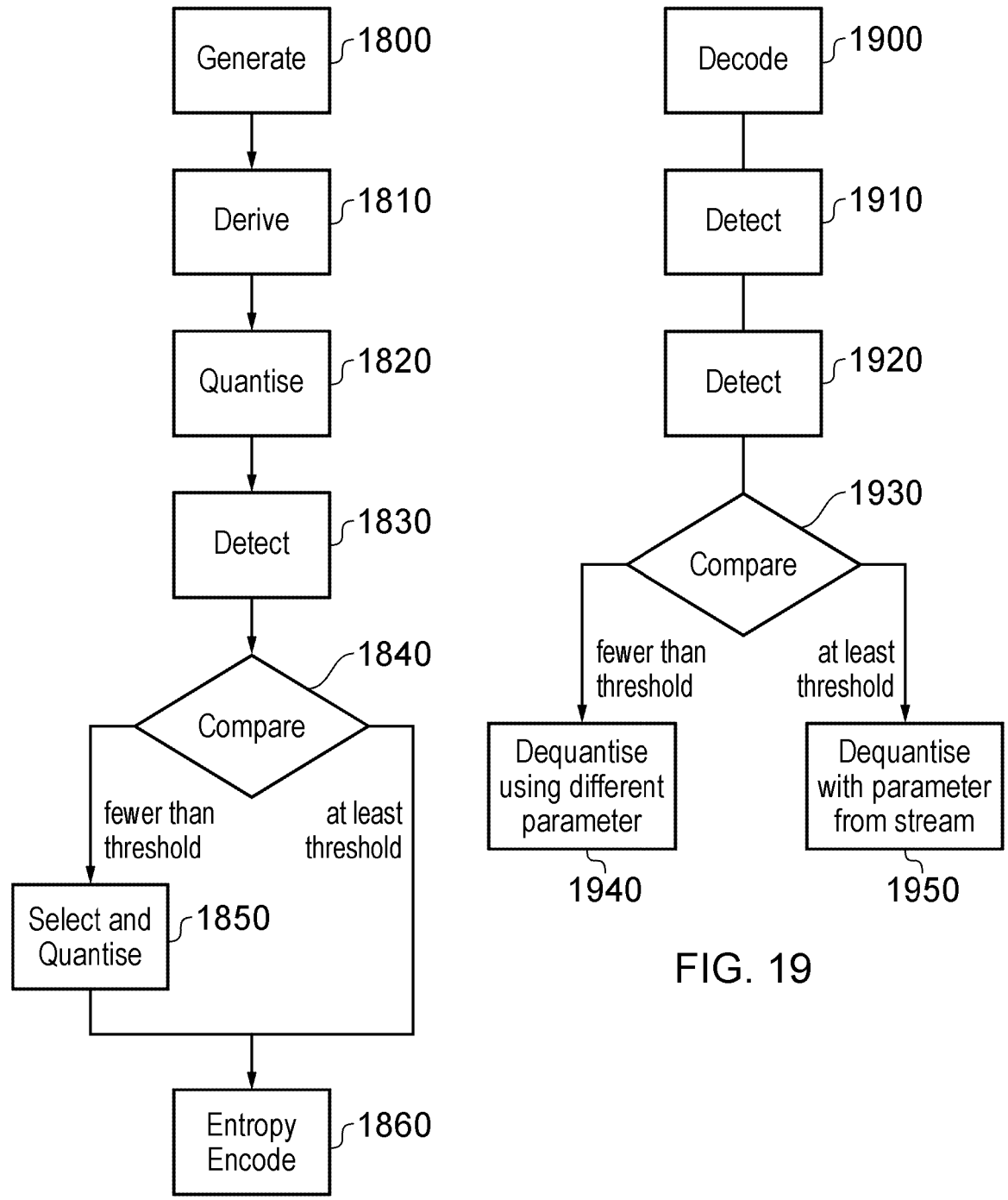
FIGS. 18 and 19 are schematic flowcharts illustrating respective methods.

FIG. 18 is a schematic flowchart illustrating a data encoding method.

At a step 1800, an ordered array of data values is generated representing an image region and having an array order.

A step 1810 involves deriving a quantization parameter indicating a quantization degree so that the ordered array of data values, when encoded using the that quantization degree, meets one or more predetermined criteria. For example, the predetermined criteria may include a data quantity criterion so that the quantity of encoded data is predicted not to exceed a required data quantity, and/or a quality or error rate criterion.

At a step 1820 the data values are quantized using a quantization degree indicated by the derived quantization parameter to generate respective quantized values.

At a step 1830 a number of non-zero quantized values is detected.

The number (and optionally location as mentioned above) of non-zero quantized values is compared to a threshold value or number at a step 1840. If no more than the threshold number of first values in the array order are non-zero, control passes to a step 1850 at which a different quantization parameter is selected, the data values are quantized using a quantization degree indicated by the selected different quantization parameter and control passes to a step 1860. Otherwise, or in other words if at lease the threshold number of first values in the array order are non-zero, control passes directly to the step 1860.

It will be appreciated that a comparison of a number n (of non-zero data values in this example) with a threshold T can be expressed in various ways, all of which are considered to be equivalent for the purposes of the present description. Two examples are as follows:

| Outcome leading to the step 1850 in FIG. 18 | Opposite outcome |
| --- | --- |
| n <= T (n is no greater than the threshold T) | n > T (n is greater than the threshold T) |
| n < T' (where T' = T + 1) (n is the threshold T') | n > T' (n is at least the threshold T') |

It will also be appreciated that in some instances the number of non-zero quantized values which would result from the quantization process could be predicted or detected without actually first quantizing the data values. Here, effectively the quantizer is performing v[i]/denominator. The prediction or test can be to check that abs(v[i])>=denominator (although rounding will modify the actual offset being tested). In such a case, the quantization step 1820 would be moved to follow the comparison step 1840, so that at either outcome of the comparison step, quantization takes place, the choice being made by the comparison step as to whether the a quantization degree indicated by quantization parameter derived at the step 1810 is used, or a quantization degree indicated by the different quantization parameter selected at the step 1850 is used.

At the step 1860, at least the non-zero quantized values are entropy encoded.

As a further variation of FIG. 18, it will be appreciated that as discussed above, the detection at the steps 1830, 1840 could in fact be made in respect of the data before quantization, which would imply repositioning the steps 1830, 1840 to between the steps 1800, 1810, with a quantization degree indicated by either the derived quantization parameter at the step 1810 or a selected different quantization parameter being used at the step 1820.

FIG. 19 is a schematic flowchart illustrating a method of decoding a data stream.

At a step 1900, an ordered array of data values having an array order is entropy decoded.

A step 1910 involves detecting a number of non-zero entropy decoded values. At a step 1920, a quantization parameter is detected from the data stream. Note that the step 1920 can be carried out in any flowchart position relative to the order of the steps 1900, 1910, or indeed in parallel with either of them.

At a step 1930, a number of first entropy decoded values in the array order (the data before dequantization) is compared with a threshold number. If at least the threshold number are non-zero, control passes to a step 1950 at which the entropy decoded values are dequantized using a quantization degree indicated by the quantization parameter from the data stream (which is to say, the parameter provided by the encoder), or otherwise control passes to a step 1940 involving selecting a different quantization parameter and dequantizing the entropy decoded data values using a quantization degree indicated by the selected different quantization parameter.

The same considerations apply to the comparison with a threshold as those discussed above.

The discussion above leads to at least two potential example implementations of the present techniques.

In some example implementations, the encoder selects and uses either the derived quantization parameter (at the step 1810) or the different quantization parameter (at the step 1850) and encodes to the data stream whichever quantization parameter it has actually used in the quantization of the encoded data. In such cases, a conventional decoder may be employed, which simply detects, and uses for dequantization, a quantization parameter from the encoded data stream. Another option could be to add one or more additional flags to the datastream to indicate the use of a different quantization parameter for a particular block size/component/bit depth or the like.

But in other example implementations, the encoder derives a quantization parameter at the step 1810 and writes the derived quantization parameter to the data stream even if a different quantization parameter is actually used to indicate a quantization degree indicated for actual quantization at the step 1850. In this case, the method of FIG. 19 is relevant, in that the decoder applies the same test (at the corresponding steps 1840, 1930) and also selects the different quantization parameter if the same conditions apply. In example embodiments, the decoder selects the same different quantization parameter in these circumstances as that selected at the encoder, for example by applying a corresponding set of criteria or rules determining the selection of the different quantization parameter.

These arrangements, in which the quantization parameter actually written to the data stream is not the one used, and in which the selection of the quantization parameter at the step 1810 is actually over-ridden by both the encoder and the decoder, can be useful in situations in which (for example) the encoding or use of other operational features or parameters depend upon the transmitted quantization parameter. They can also be useful when the way in which the quantization parameter is actually transmitted in the data stream itself depends on other parameters which are not altered by the present techniques.

Figure 20:
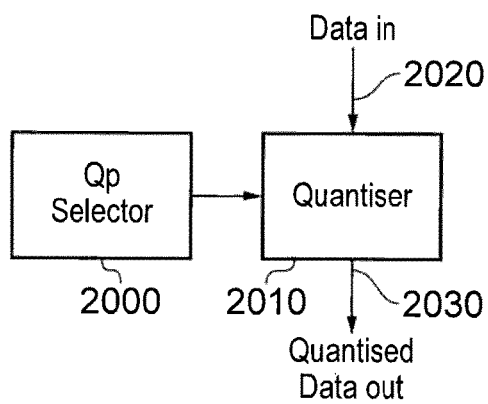
FIGS. 20 and 21 schematically illustrate portions of conventional encoders and decoders, respectively.

FIG. 20 schematically illustrates a previously proposed quantization arrangement in which a quantization parameter (Qp) selector 2000 selects a quantization parameter which is then applied by a quantizer 2010 so that a quantization degree indicated by the quantization parameter is used to quantize input data 2020 to generate quantized output data 2030. The selected value of Qp is communicated directly or indirectly (by a dependence upon other data or parameters, for example) in or with the encoded data stream.

Figure 21:
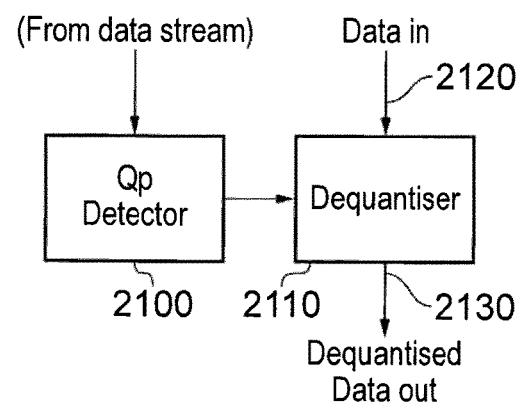

At the decoder side, FIG. 21 schematically illustrates an arrangement in which a quantization parameter detector 2100 detects the quantization parameter encoded in or with the data stream and a dequantizer 2110 applies a quantization degree indicated by the detected quantization parameter to input data 2120 to generate dequantized output data 2130.

Figure 22:
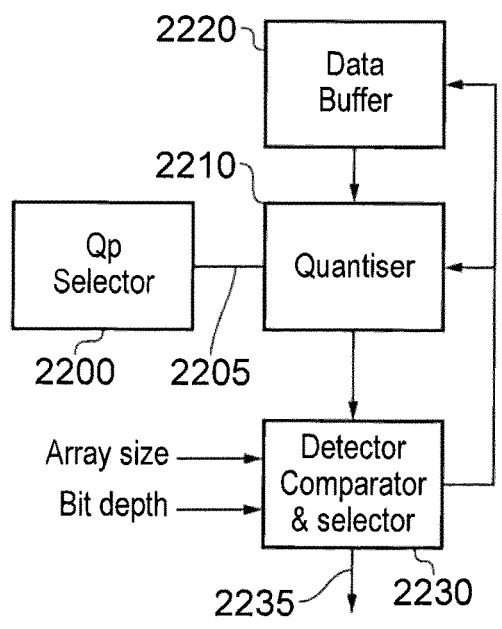
FIGS. 22 and 23 schematically illustrate portions of encoders and decoders using the techniques of FIGS. 18 and 19, respectively.

Applying the techniques discussed above, FIG. 22 schematically illustrates a part of an encoder using these techniques.

As before, a quantization parameter selector 2200 derives an initial quantization parameter $Qp_{init}$ which is applied to input data (for example, stored temporarily in a data buffer 2220) by a quantizer 2210.

The quantized data generated by the application of a quantization degree indicated by the initial quantization parameter $Qp_{init}$ is provided to a detector, comparator and selector unit 2230. This unit carries out the operations discussed in connection with the steps 1830, 1840, 1850 of FIG. 18. In particular, it detects the number of non-zero data in the quantized data generated by the application of the initial quantization parameter $Qp_{init}$ which are first in the array order and compares this number to a threshold number such as 1 or 3. If the number of non-zero data are less than the threshold in use, then a different QP value, $QP_{new}$, is selected by the unit 2230. The quantizer 2210 and data buffer 2220 are controlled by the unit 2230 to quantize the data again using $QP_{new}$.

Either in response to a detection that at least the threshold number of non-zero data are present, or in response to requantization with $QP_{new}$, the quantized data are output as an output signal 2235.

The selection of $Qp_{new}$ can be made based in various ways and on the basis of various parameters.

In some example, $Qp_{new}$ can represent a constraint on the minimum Qp to be used in a particular situation.

In some examples, $Qp_{new}$ can be selected by a look-up or function based on the array size of the ordered array of data values. For example, due to the scaling of the respective transformation process. different values of $Qp_{new}$ may be applicable to 4×4, 8×8, 16×16, 32×32 or other block sizes. For example, blocks of double the size would typically have double the minimum quantization scaling value (which, for a HEVC style Qp method, would lead to a Qp increase of 6). So typically a 4×4 DCT scales by sqrt(4*4)=4, and therefore the minimum QP would apply an effective quantization of at least 4. Here sqrt signifies a square root.

In some examples, $Qp_{new}$ can be selected by a look-up or function based on the bit depth of the image data being handled. For example, different values of $Qp_{new}$ may be applicable to 8 bit data, 9 bit data, 10 bit data, 12 bit data and so on. For example, there could be an increase of Qp of 3 per bit of bit depth over 8 bits.

In some examples, $Qp_{new}$ can be selected by a look-up or function based on the transform type (for example, discrete cosine transform, discrete sine transform, transform skip, non-separable secondary transform and the like) used in the generation of the ordered array of data values.

In some examples, any permutation of two or more of these factors (transform type, array size and bit depth) can be used so that the value of $Qp_{new}$ is obtained by a two-dimensional look-up or a function of both factors.

In any of the above examples, the same process can be carried out at the decoder, so that even if the initial quantization parameter $Qp_{init}$ is signalled in or with the data stream, the appropriate $Qp_{new}$ can be obtained and used at the decoder side.

In other examples, the process described above can be carried out iteratively at the encoder, so that a detection by the unit 2230 that there are insufficient non-zero first quantized data values, when $QP_{init}$ is used, results in a change in Qp so if that $Qp_{new}=QP_{init}-delta$ (where delta is a change amount, which may itself be dependent upon bit depth and/or array size) and the quantization process is repeated. If there are still insufficient non-zero first quantized data values in the array order, then the change can be applied a further time, or in other words:

$$Qp_{new}(2)=Qp_{new}(1)-delta,$$

and the process repeated iteratively until the test against the threshold number is passed (which is to say there are sufficient non-zero first quantized data values in the array order), and the final value of $Qp_{new}$ signalled in or with the data stream.

In general, an encoder can try both cases (or if there are multiple conditionals/QPs, it can try all possible outcomes), to detect a Qp for use, making sure that for the trial with the modified quantizer will be detected appropriately by the decoder (for example by blanking off coefficients). Such trials may result in a lower cost in coding (in terms of a balance between bit rate and picture quality).

Figure 23:
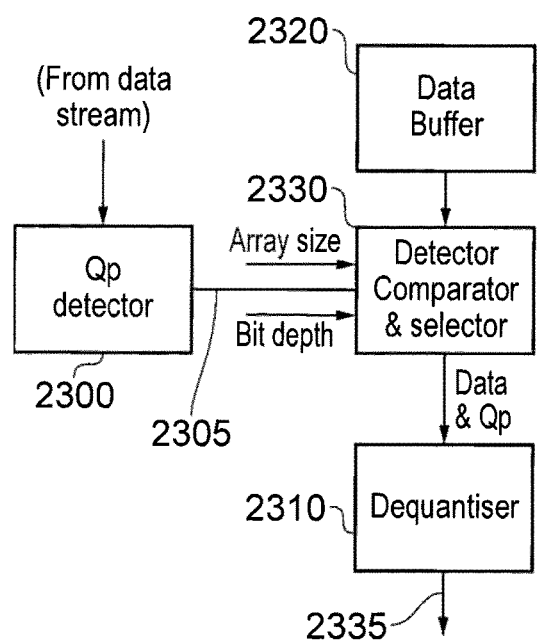

FIG. 23 schematically illustrates an arrangement for use at a decoder, in which entropy-decoded data are held temporarily in a data buffer 2320 and are selectively dequantized by a dequantizer 2310 using a quantization degree indicated by a quantization parameter $Qp_{init}$ signalled in or with the data stream, or with a different value $Qp_{new}$.

The entropy-decoded data are passed to a detector, comparator and selector unit 2330 which carries out the functionality of the steps 1920, 1930 of FIG. 19, so that if there are no more than the threshold number of first non-zero entropy-decoded values in the array order (where the threshold is, for example, 1 or 3), the unit 2330 controls the dequantizer 2310 to perform dequantization of the entropy-decoded data with a different QP, namely $Qp_{new}$ which is selected (potentially in dependence upon bit depth, array size or both) using the same dependency as the selection process carried out at the encoder side. If the comparison of the step 1930 shows that there are at least the threshold number of non-zero data values, the Qp value 2305 detected by a Qp detector from the data stream is used.

The dequantized data are provided as an output signal 2335 for further processing.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective aspects and features are defined by the following numbered clauses:

1. A data encoding method comprising:
   generating an ordered array of data values representing an image region and having an array order;
   deriving a quantization parameter indicating a quantization degree so that the ordered array of data values, when encoded using that quantization degree, meets one or more predetermined criteria;
   detecting a number of non-zero values as first values in the array order, amongst the ordered array of data values or the ordered array of data values as quantized according to a quantization degree indicated by the derived quantization parameter;
   if the detected number is no more than a threshold number, selecting a different quantization parameter;
   quantizing the data values to generate respective quantized values; and
   entropy encoding the quantized values.

2. A method according to clause 1, in which the generating step comprises:
   predicting an image region for an image to be encoded; and
   generating a residual image region dependent upon the difference between the predicted image region and a corresponding region of the image to be encoded;

in which the ordered array of data values comprises data values of a representation of the residual image region.

3. A method according to clause 2, comprising frequency transforming the residual image region;

in which the ordered array of data values comprises data values of a frequency-transformed representation of the residual image region.

4. A method according to clause 3, in which the array order is from a data value representing lowest spatial frequencies to a data value representing highest spatial frequencies.

5. A method according to clause 2, in which:

the predicting step comprises predicting samples of the image region in dependence upon other previously encoded and decoded image samples, displaced from the predicted samples in a direction defined by a prediction mode; and the array order is such that predicted data values spatially closer to the other previously encoded and decoded image samples are earlier in the array order.

6. A method according to any one of the preceding clauses, in which the one or more predetermined criteria comprise at least a data quantity criterion.

7. A method according to any one of the preceding clauses, in which the threshold number is 1.

8. A method according to any one of clauses 1 to 6, in which the threshold number is 3.

9. A method according to any one of the preceding clauses, in which the selected different quantization parameter depends on the array size of the ordered array of data values.

10. A method according to any one of the preceding clauses, in which the selected different quantization parameter depends on the bit depth of the ordered array of data values.

11. A method according to any one of the preceding clauses, in which the selected different quantization parameter depends on a transform type applicable to the ordered array of data values.

12. A method of decoding a data stream, the method comprising:

entropy decoding an ordered array of data values having an array order;

detecting a number of non-zero entropy decoded values;

detecting a quantization parameter from the data stream; and if at least a threshold number of first entropy decoded values in the array order are non-zero, dequantizing the entropy decoded values using a quantization degree indicated by the quantization parameter from the data stream, or otherwise selecting a different quantization parameter and dequantizing the entropy decoded data values using a quantization degree indicated by the selected different quantization parameter.

13. A method according to clause 12, in which the selected different quantization parameter depends on the array size of the ordered array of data values.

14. A method according to clause 12 or clause 13, in which the selected different quantization parameter depends on the bit depth of the ordered array of data values.

15. A method according to any one of clauses 12 to 14, in which the selected different quantization parameter depends on a transform type applicable to the ordered array of data values.

16. A method according to any one of clauses 12 to 15, in which the threshold number is 1.

17. A method according to any one of clauses 12 to 15, in which the threshold number is 3.

18. Computer software which, when executed by a computer, causes the computer to perform the method of any one of the preceding clauses.

19. A non-transitory machine-readable storage medium which stores computer software according to clause 18.

20. A data encoding apparatus configured to encode an ordered array of data values representing an image region and having an array order, the apparatus comprising:

a quantization parameter generator configured to derive a quantization parameter indicating a quantization degree so that the ordered array of data values, when encoded using that quantization degree, meets one or more predetermined criteria;

a detector configured to detect a number of non-zero values as first values in the array order, amongst the ordered array of data values or the ordered array of data values as quantized according to a quantization degree indicated by the derived quantization parameter;

a controller configured, if the detected number is no more than a threshold number, to select a different quantization parameter;

a quantizer configured to quantize the data values to generate respective quantized values;

and an entropy encoder configured to entropy encode the quantized values.

21. Apparatus for decoding a data stream, the apparatus comprising:

an entropy decoder configured to entropy decode an ordered array of data values having an array order;

a detector configured to detect a number of non-zero entropy decoded values and to detect a quantization parameter from the data stream; and a dequantizer configured, if at least a threshold number of first entropy decoded values in the array order are non-zero, to dequantize the entropy decoded values using a quantization degree indicated by the quantization parameter from the data stream, or otherwise to select a different quantization parameter and to dequantize the entropy decoded data values using a quantization degree indicated by the selected different quantization parameter.

22. Video storage, capture, transmission or reception apparatus comprising apparatus according to clause 20 or clause 21.

23. Video capture apparatus comprising an image sensor and an encoder apparatus according to clause 20.

24. Video capture apparatus according to clause 23 further comprising an apparatus according to clause 21 and a display to which the data stream is output.

25. Video capture apparatus according to clause 23 comprising a transmitter configured to transmit an encoded data stream.

The invention claimed is:

1. A data encoding method comprising:

generating an ordered array of data values representing an image region and having an array order;

deriving a quantization parameter indicating a quantization degree so that the ordered array of data values, when encoded using that quantization degree, meets one or more predetermined criteria;

determining, by circuitry that a transform skip mode is to be used where the data values are not subjected to a transform;

when samples in the ordered values correspond to sample values in a transform skip mode, and the quantization degree corresponds to a threshold number, selecting a different quantization parameter;

quantizing the data values based on the selected different quantization parameter to generate respective quantized values; and entropy encoding the quantized values.

2. The method according to claim 1, wherein the generating further comprises:
predicting an image region for an image to be encoded; and
generating a residual image region dependent upon the difference between the predicted image region and a corresponding region of the image to be encoded;
in which the ordered array of data values comprises data values of a representation of the residual image region.

3. The method according to claim 2, wherein:
the predicting step comprises predicting samples of the image region in dependence upon other previously encoded and decoded image samples, displaced from the predicted samples in a direction defined by a prediction mode; and
the array order is such that predicted data values spatially closer to the other previously encoded and decoded image samples are earlier in the array order.

4. The method according to claim 2, wherein for an array of data values for which transform skip is not used, the derived quantization parameter is used on transformed data values of a frequency transformed representation of the residual image region.

5. The method according to claim 1, wherein the one or more predetermined criteria comprise at least a data quantity criterion.

6. The method according to claim 1, wherein the threshold number is 1 or in which the threshold number is 3.

7. The method according to claim 1, wherein the selected different quantization parameter depends on the array size of the ordered array of data values or in which the selected different quantization parameter depends on a bit depth of the ordered array of data values.

8. The method according to claim 1, further comprising reordering the array of data values in a transform skip mode.

9. The method according to claim 1, further comprising selecting a different quantization parameter based on a look-up up in a non-transitory storage medium.

10. A method of decoding a data stream, the method comprising:
entropy decoding an ordered array of data values having an array order;
detecting, by circuitry, that a transform skip mode has been used wherein the data values are not subjected to a transform;
detecting a quantization parameter from the data stream; and
when samples in the ordered array of data values correspond to sample values in a transform skip mode, if a quantization degree meets a threshold number dequantizing the entropy decoded values using a quantization degree indicated by the quantization parameter from the data stream, or otherwise selecting a different quantization parameter and dequantizing the entropy decoded values using a quantization degree indicated by the selected different quantization parameter.

11. The method according to claim 10, wherein the selected different quantization parameter depends on the array size of the ordered array of data values.

12. The method according to claim 10, wherein the selected different quantization parameter depends on a bit depth of the ordered array of data values.

13. The method according to claim 10, wherein the threshold number is 1 or 3.

14. The method according to claim 10, wherein for an array of data values for which transform skip is not used, the detected quantization parameter is used on transformed data values of a frequency transformed representation received data values.

15. The method according to claim 10, further comprising reordering the array of data values in a transform skip mode.

16. The method according to claim 10 comprising selecting a different quantization parameter based on a look-up up in a non-transitory storage medium.

17. A non-transitory machine-readable storage medium comprising computer software code which when executed causes a computer to perform the method according to claim 1.

18. A non-transitory machine-readable storage medium comprising computer software code which when executed causes a computer to perform the method according to claim 10.

19. A data encoding apparatus configured to encode an ordered array of data values representing an image region and having an array order, the apparatus comprising:
a quantization parameter generator configured to derive a quantization parameter indicating a quantization degree so that the ordered array of data values, when encoded using that quantization degree, meets one or more predetermined criteria;
a detector configured to detect a number of non-zero values as first values in the array order, amongst the ordered array of data values or the ordered array of data values as quantized according to a quantization degree indicated by the derived quantization parameter;
a controller configured, if the detected number is no more than a threshold number, to select a different quantization parameter;
a quantizer configured to quantize the data values to generate respective quantized values; and
an entropy encoder configured to entropy encode the quantized values.

20. An apparatus for decoding a data stream, the apparatus comprising:
an entropy decoder configured to entropy decode an ordered array of data values having an array order;
a detector configured to detect a number of non-zero entropy decoded values and to detect a quantization parameter from the data stream; and
a dequantizer configured, if at least a threshold number of first entropy decoded values in the array order are non-zero, to dequantize the entropy decoded values using a quantization degree indicated by the quantization parameter from the data stream, or otherwise to select a different quantization parameter and to dequantize the entropy decoded data values using a quantization degree indicated by the selected different quantization parameter.

21. A video storage, capture, or reception apparatus comprising apparatus according to claim 20.

* * * * *